US005235999A

United States Patent [19]

Lindquist et al.

[11] Patent Number: 5,235,999

[45] Date of Patent: Aug. 17, 1993

[54] DROP TUBE ASSEMBLY WITH SHUT-OFF VALVE AND METHOD FOR ASSEMBLING THE SAME

[75] Inventors: Thomas R. Lindquist; Don K. Shackelford, both of Denair, Calif.

[73] Assignee: Guillotine, Inc., Stockton, Calif.

[21] Appl. No.: 887,975

[22] Filed: May 22, 1992

Related U.S. Application Data

[63] Continuation-in-part of Ser. No. 799,827, Nov. 26, 1991, abandoned.

[51] Int. Cl.[5] .................... F16K 31/24; F16K 33/00

[52] U.S. Cl. .................... 137/15; 137/433; 141/198

[58] Field of Search .................... 141/198; 137/423, 430, 137/433, 15

[56] References Cited

U.S. PATENT DOCUMENTS

| | | | |
|---|---|---|---|
| 351,200 | 10/1886 | Montgomery | 137/433 |
| 461,383 | 10/1891 | Guild | 137/433 |
| 772,369 | 10/1904 | Parrish | 137/433 |
| 1,339,750 | 5/1920 | Foister | 137/433 |
| 1,373,237 | 3/1921 | Gunderson | 137/433 |
| 1,470,213 | 10/1923 | Black | 137/433 |
| 1,508,903 | 9/1924 | Strandt | 137/433 |
| 1,522,982 | 1/1925 | Strandt | 137/433 |
| 2,106,340 | 1/1938 | Conover | 137/433 |
| 2,122,866 | 7/1938 | Lippold | 137/433 |
| 2,940,467 | 6/1960 | Smith | 137/433 |

FOREIGN PATENT DOCUMENTS

| | | | |
|---|---|---|---|
| 456191 | 2/1928 | Fed. Rep. of Germany | 137/433 |
| 724968 | 2/1955 | United Kingdom | 137/433 |

*Primary Examiner*—George L. Walton
*Attorney, Agent, or Firm*—Townsend and Townsend Khourie and Crew

[57] ABSTRACT

A tank filling drop tube assembly (2, 48) includes a drop tube (16, 50) and a linear motion shut-off valve assembly (24). One embodiment includes a barrier (30) which seals the interior of the drop tube. Outlet ports (32) are formed through the drop tube above the barrier. A restrictor sleeve (26, 58) is mounted around the outside of the drop tube just below the outlet ports. The restrictor sleeve is connected to a float (36) at the upper end (10) of the drop tube. When the tank (4) is substantially filled, the float lifts the restrictor sleeve to seal the outlet ports to help prevent overfilling of the tank.

14 Claims, 5 Drawing Sheets

DROP TUBE ASSEMBLY WITH SHUT-OFF VALVE AND METHOD FOR ASSEMBLING THE SAME

This is a continuation-in-part of U.S. patent application Ser. No. 07/799,827 filed Nov. 26, 1991 now abandoned, the disclosure of which is incorporated by reference.

BACKGROUND OF THE INVENTION

Fuel storage tanks, as well as other types of tanks and containers, are often filled from tank trucks and other sources of liquid. Typically, the tank truck has a filler hose which is connected to a twist lock fitting mounted to the upper end of a drop tube housed within the tank. Drop tubes are used to reduce or eliminate static electricity which could be created if the liquid were merely pumped directly into the tank through an open port at the top of the tank. The filling of the tank can be either gravity-fed from the fuel tank truck or it can be assisted by a pump. In either event, it is important that the tank not be overfilled. One way to do this is through the use of an automatic shut-off valve assembly. Such assemblies typically include a float within the tank which actuates some sort of valve element along the flow path from the end of the supply hose to the bottom of the drop tube.

One type of conventional shut-off valve assembly includes a flapper valve housed within the drop tube; the flapper valve is coupled to a float positioned on the outside of the drop tube. An example of this type sold by EBW of Muskegon, Mich. as No. 9010 Auto Limiter. Another type if drop tube shut-off valve uses a float within the tank to control a valve assembly positioned external on the tank between the top of the full pipe and the filler hose. An example of this type is sold by Clay and Bailey Mfg. Co. of Kansas City, Mo. as the MINO Filling Limiter.

What is lacking in the art is a truly simply, relatively inexpensive and straightforward shut-off valve assembly for use with tanks having a drop tube.

SUMMARY OF THE INVENTION

The present invention is directed to a drop tube assembly, including a shut-off valve assembly which uses simple, straight-line movement to shut off the flow into the tank once the tank is filled.

The drop tube assembly include an elongate drop tube having an upper end adapted with a fitting for coupling to the filler hose of a tank truck or other source of liquid used to fill the tank or other container. The lower end of the drop tube is positioned adjacent the bottom of the tank. Fuel flows through the drop tube, out the lower end of the drop tube and into the tank. To help prevent the tank from being overfilled, a shut-off valve assembly is used. The shut-off valve assembly includes a barrier sealing the interior of the drop tube, such as at the lower end of the drop tube. An outlet port is formed through the drop tube above the barrier. Liquid can flow through the drop tube, through the outlet port and into the tank. A restrictor element, typically in the form of a sleeve, is mounted around the outside of the drop tube near the outlet port. The restrictor sleeve is connected to a float located external of the drop tube and typically near the upper end of the drop tube. When the tank is filled to the desired level, the float moves the restrictor sleeve so it surrounds the outlet port, thus at least substantially stopping liquid flow through the drop tube, thereby preventing overfilling of the tank.

In an alternative embodiment of the invention, the shut-off valve assembly includes a liquid level sensing floating valve element mounted within the interior of the drop tube. When the liquid level within the tank reaches the level of the valve element, the valve element begins floating within the liquid until it moves up to block a segment of the drop tube, thereby at least substantially halting liquid flow through the drop tube. Thus, in this embodiment, the float is within the interior of the hollow drop tube and acts as the valve element which actually seals off the drop tube.

The primary advantage of the invention is its simplicity. In one embodiment, a simple float, typically tubular in shape and surrounding the drop tube near its upper end, is connected to a restrictor sleeve. The restrictor sleeve is mounted to the outside of the drop tube and is configured and positioned to open and close the outlet port in the drop tube. In the alternative embodiment of the invention, an even simpler construction is used in which the only movable element is the float, mounted within the interior of the drop tube, which acts as the valve element as well. The simplified, straightforward construction of the invention reduces the cost and helps to promote trouble-free operation of the drop tube assembly.

Another advantage of the invention is that the restrictor sleeve, as well as the combination liquid level sensing float and valve element in the alternative embodiment, need not completely seal the outlet port to be effective. Rather, some leakage to the outlet port is permissible; the shut-off valve assembly only needs to substantially halt the flow of liquid entering the tank. This permits the use of looser tolerances and looser fits among the elements to help further lower cost and aid trouble-free operation.

The opposed surfaces of the restrictor sleeve and the drop tube in the region adjacent the outlet port preferably have a small (e.g., ½ to 2%) taper extending downwardly and outwardly. It has been found that this helps to ensure trouble-free operation of the restrictor sleeve as it drops away from the outlet port.

Other features and advantages of the invention will appear from the following description in which the preferred embodiments have been set forth in detail in conjunction with the accompanying drawings.

DESCRIPTION OF THE PREFERRED EMBODIMENT

Figure 1:
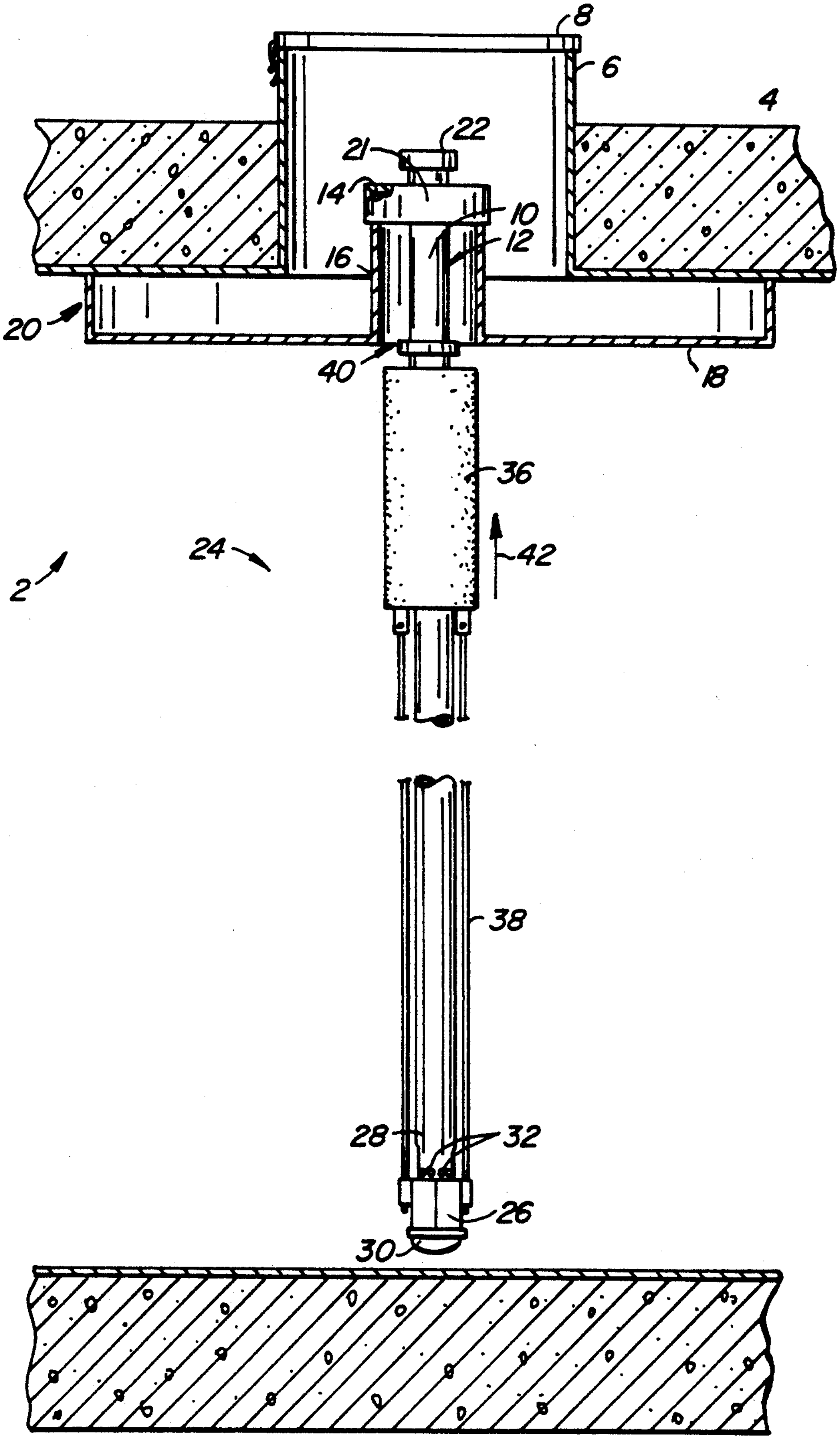
FIG. 1 is a simplified side view showing a drop tube assembly made according to the invention and mounted within an above-ground fuel storage tank.

FIG. 1 illustrates, in simplified form, a drop tube assembly 2 mounted within an above-ground fuel storage tank 4 having a manway 6 covered by a hinged lid 8 which provides access to the upper end 10 of a drop tube 12. Upper end 10 is positioned below lid 8 and above the upper edge 14 of a centrally positioned tube 16 extending from the bottom 18 of an overfill containment reservoir 20. Drop tube assembly 2 is mounted to and supported by upper edge 14 of tube 16 by a threaded positioner 21. Positioner 21 has internal threads (not shown) which engage external threads (not shown) on tube 16. Upper end 10 has a conventional twist lock fitting 22 to permit the coupling of a fuel delivery hose, not shown, from a fuel tank truck, also not shown, or other liquid supply source, as is conventional.

Drop tube assembly 2 also includes a shut-off valve assembly 24. Assembly 24 includes a restrictor sleeve 26, typically made of polytetrafluoroethylene, positioned at the lower end of 28 of drop tube 12. Restrictor sleeve 26 is supported vertically by an end cap 30 which seals lower end 28 of drop tube 12 and thus acts as a barrier to prevent the flow of liquid out directly through the bottom of drop tube 12. A number of outlet ports of 32 are formed in drop tube 12 at lower end 28 just above restrictor sleeve 26. Outlet ports 32 are sized so that the outlet ports do not create any substantial restriction to free flow of liquid through the drop tube and into tank 4 based upon the expected flow rates from the source of liquid.

Shut-off valve assembly 24 also includes a hollow cylindrical float 36 loosely circumscribing drop tube 12 toward upper end 10. Float 36 is connected to restrictor sleeve 26 by a pair of connecting rods 38. The movement of shut-off valve assembly 24 is restricted downwardly by restrictor sleeve 26 contacting end cap 30 and upwardly by float 36 contacting an axially positionable float stop 40 mounted to the exterior of drop tube 12.

During use, the user opens lid 8 and connects a liquid supply hose from the tank truck, or other source of liquid, using fitting 22. Liquid is then introduced into tank 4 either by gravity alone or with the aid of a pump. When the level liquid reaches float 36, float 36, being buoyant in the liquid, begins to lift restrictor sleeve 26. When the level of liquid within tank 4 is sufficiently high, typically when tank 4 is about 90% filled, float 36 moves upwardly in the direction of arrow 42, thus lifting restrictor sleeve 26 to cover outlet ports 32. Excessive upward movement of float 36 is halted by float stop 40. When this occurs, outlet ports 32 are substantially, although not perfectly, sealed to substantially stop the flow of liquid into tank 4. This is sensed by the operator who can halt delivery of the liquid into tank 4 before an overfill condition occurs. The connecting hose is then disconnected and lid 8 is returned to its closed position of FIG. 1 in a conventional manner.

Figure 1A:
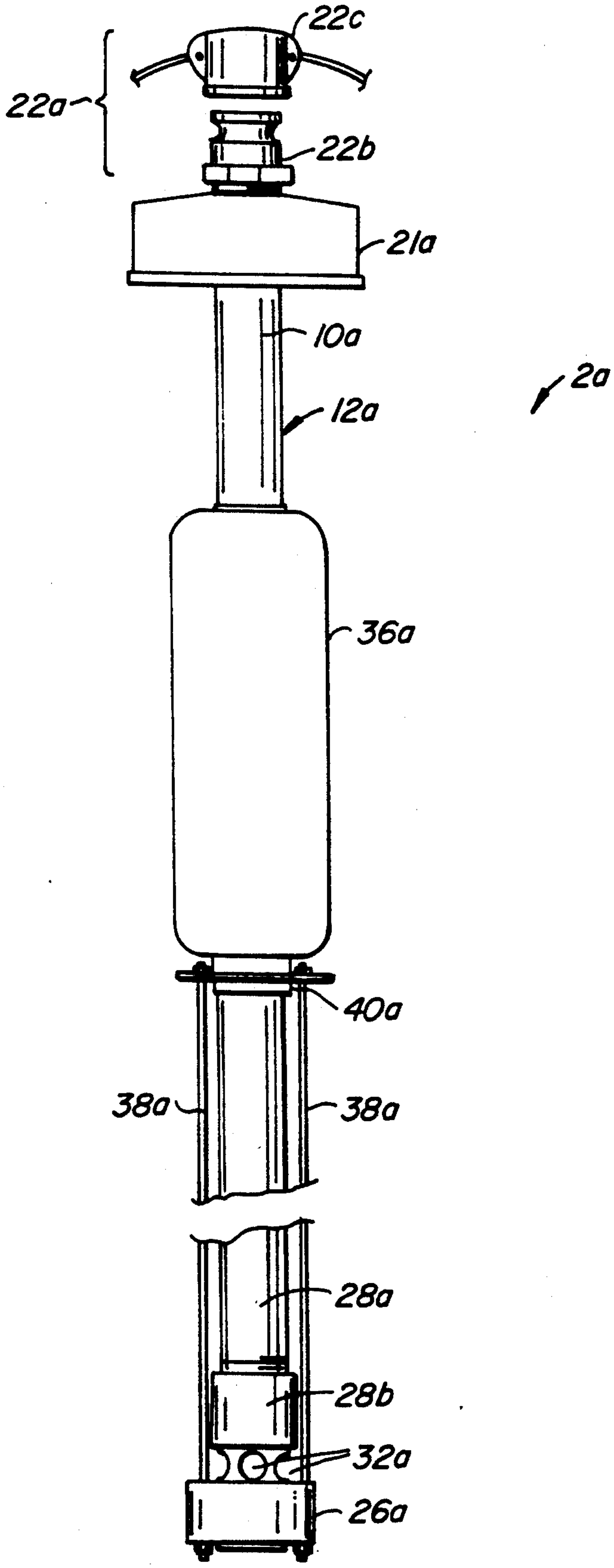
FIG. 1A is a simplified side view of an alternative embodiment of the drop tube assembly of FIG. 1.
Figure 1B:
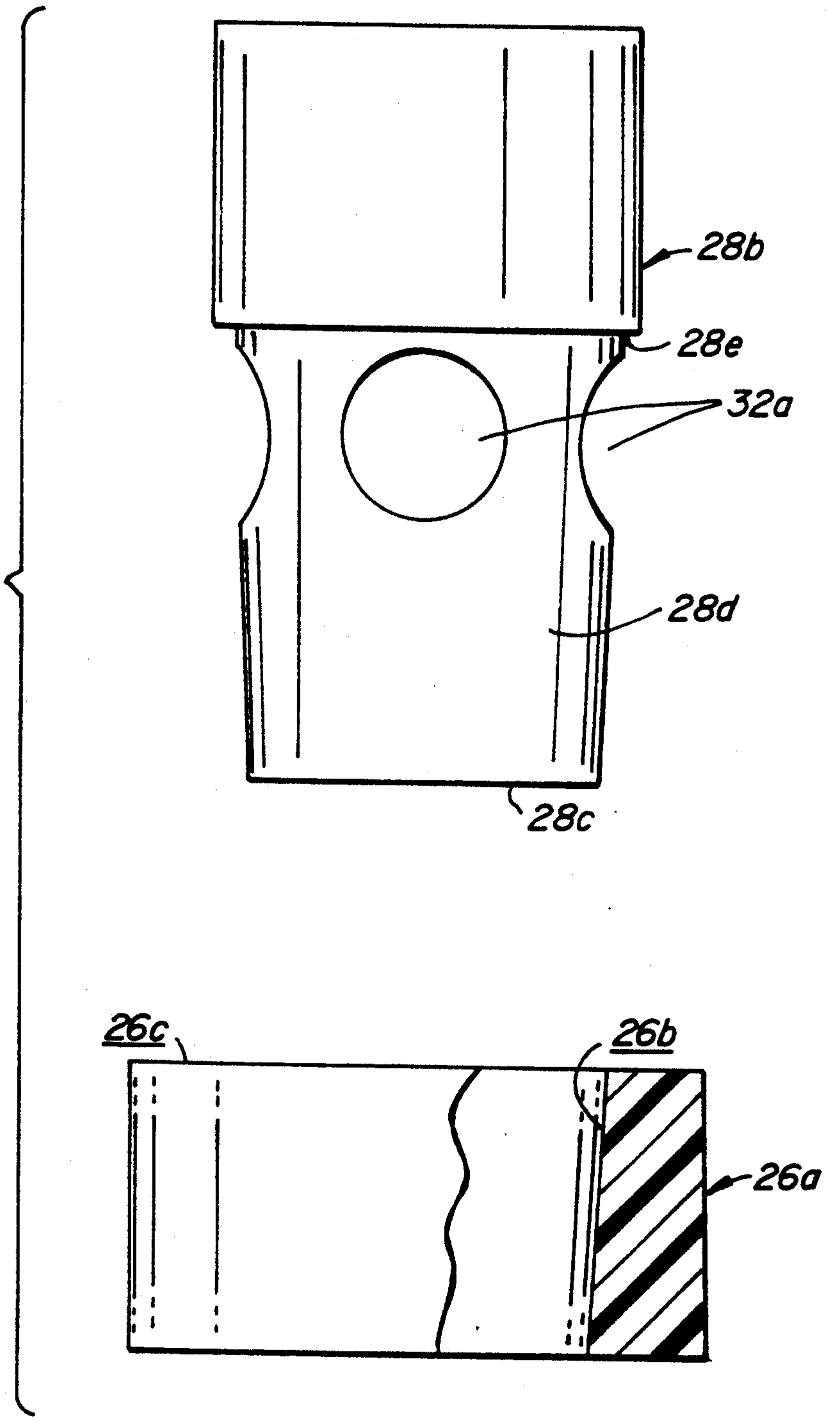
FIG. 1B is an enlarged exploded orthographic view of the restrictor sleeve and valve body extension of FIG. 1A.

FIGS. 1A and 1B illustrate an alternative embodiment of the drop tube assembly of FIG. 1 with corresponding reference numerals referring to corresponding parts. Drop tube assembly 2*a* includes a drop tube 12*a* having a threaded positioner 21*a* mounted to the upper end 10*a* of the drop tube. Also mounted to upper end 10*a* is a twist lock fitting 22*a* including an adaptor 22*b* which is threadably mounted to the upper end 10*a* and a cap 22*c* which can be removed from adaptor 22*b* to permit access to the interior of drop tube 12*a*. Twist lock fitting 22*a* is preferably a conventional fitting such as manufactured by PT Coupling Co. of Enid, Okla. as part no. 15V. The lower end 28*a* of drop tube 12*a* has a cup-shaped extension 28*b* threadably mounted to the lower end. Cup shape extension 22*b* has a number of outlet ports 32*a* formed therein to permit liquid to escape from drop tube 12*a* through the outlet ports. The bottom 28*c* of extension 22*b* is sealed. The lower part 28*d* of extension of 28*b* has an outer surface which tapers inwardly and downwardly at an angle of approximately 1%. Restrictor sleeve 26*a* is mounted over lower part 28*d* and has an inner, inwardly and downwardly tapered surface 26*b* which tapers at the same angle as lower part 28*d*. Extension 28*b* includes a shoulder 28*e* adjacent lower part 28*d* which contacts an upper surface 26*c* of restrictor sleeve 26*a* when restrictor sleeve 26*a* has been lifted to cover outlet ports 32*a* to halt the upward movement of sleeve 26*a*. When at this position, a small diametral space or gap exists between lower part 28*d* and inner surface 26*b*, preferably totaling about 0.002 inch (0.05 mm). As with the embodiment of FIG. 1, restrictor sleeve 26*a* is raised and lowered through the attachment of the restrictor sleeve to cylindrical float 36*a* by connecting rods 38*a*. Downward movement of float 36*a* is restricted by an axially positionable float stop 40*a* while the engagement of surface 26*c* with shoulder 28*e* halts the upper movement of float 36*a*, connecting rods 38*a*, and restrictor sleeve 26*a*.

Extension 28*b* and restrictor sleeve 26*a* are preferably made from an engineering plastic which has a low coefficient of thermal expansion and is impervious to the liquid that is in the tank. For liquid such as gasoline, a polyacetal resin sold under the trademark Delrin by Dupont of Wilmington, Del., has proven to work well.

Figure 2:
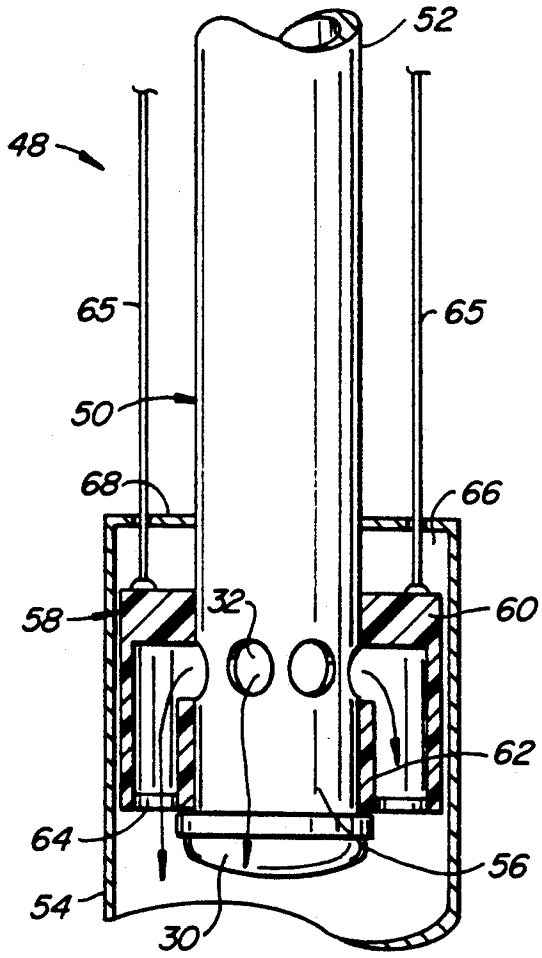
FIG. 2 is a simplified side view of a portion of an alternative embodiment of the drop tube assembly of FIG. 1.
Figure 3:
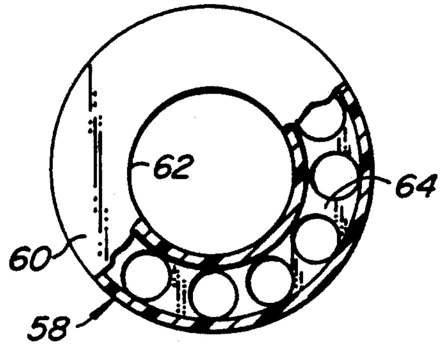
FIG. 3 is a bottom plan view of the restrictor sleeve of FIG. 2.

FIGS. 2 and 3 illustrate a further alternative embodiment of drop tube assembly 2 of FIG. 1. Drop tube assembly 48 includes a two-part drop tube 50, including an upper, smaller diameter drop tube section 52 and a lower, larger diameter drop tube section 54. Upper section 52 has its lower end 56 blocked by an end cap 30, as does drop tube 12. Restrictor sleeve 58 is similar to restrictor sleeve 26, but includes an outer, generally cup shaped portion 60 connected to an inner, cylindrical portion 62 by an apertured ring 64. Restrictor sleeve 58 is, like restrictor sleeve 26, connected to float 36 by connecting rods 65 which pass through appropriately positioned openings 66 formed in connecting portion 68 of lower drop tube section 54. The lower end (not shown) of lower drop tube section 54 is open and unrestricted so that once a liquid flows through outlet ports 32, the liquid falls through lower drop tube section 54 and out through the open end of drop tube 50. This arrangement permits outlet ports 32 to be positioned quite close to float 36, thus reducing the length of rods 65. In appropriate cases, restrictor sleeve 58 could be made of a buoyant material and outlet ports 32 could be positioned at about the desired fill level in the tank to eliminate the need for a separate float.

Figure 4:
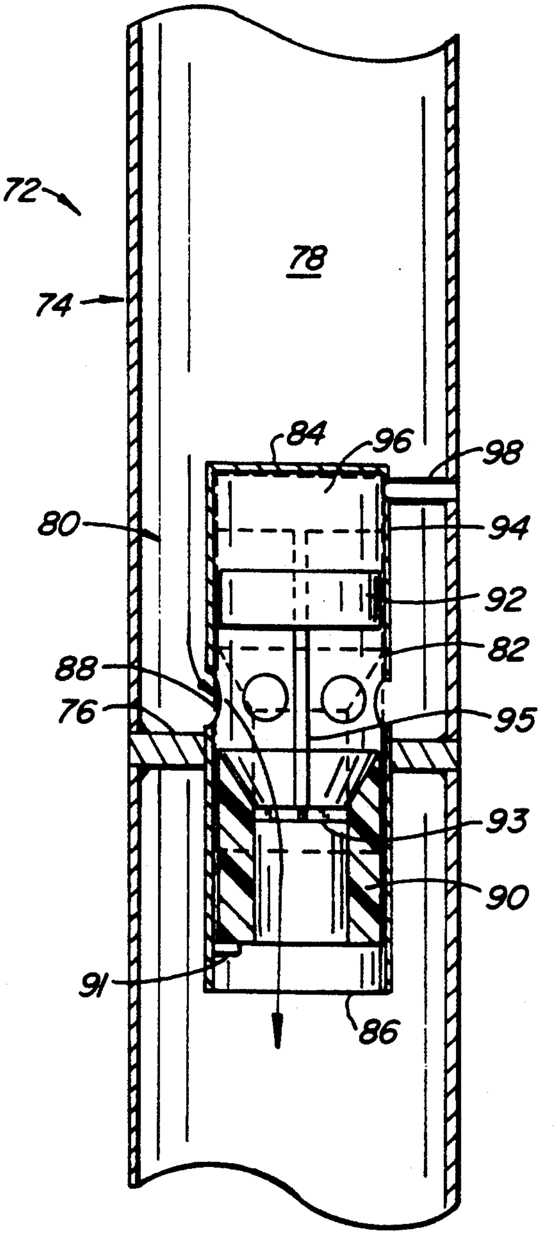
FIG. 4 is a simplified side view of an alternative embodiment of the invention in which the float is housed within the interior of the drop tube and acts as the valve element itself.

The simple, straight-line movement associated with the embodiments of FIGS. 1–3 is also achieved in the embodiment of FIG. 4. In this embodiment, drop tube assembly 72 includes a drop tube 74 having a barrier 76 positioned within the interior 78 of the drop tube. A shut-off valve assembly 80 is mounted within interior 78 at barrier 76 and includes a generally cylindrical body 82 having a closed top 84 and an open bottom 86. Cylindrical body 82 has a number of outlet ports 88 formed therethrough above barrier 76. A tubular float 90 is supported within cylindrical body 82 by a ledge 91. Float 90 has an open interior to permit fluid flow from interior 78 above barrier 76, through outlet ports 78, past a spoked rod support 93 extending from the upper end of float 90, through the interior of float 90 and past bottom 86 of body 82. The liquid flow then continues through drop tube 74 and exits the drop tube through its opened bottom end. When the level of liquid within the tank reaches float 90, float 90 begins to rise until the float seals outlet ports 88. This movement also causes a piston 92, connected to float 90 by a rod 95 and rod support 93, to move within the upper end 94 of cylindrical body of 82. Any trapped liquid or gasses within the region 96 above piston 92 can be vented into the tank through a vent 98. In lieu of piston 92, a bellows or other suitable structure can be used to permit the free movement of float 90 from its free flow or open position of FIG. 4, shown in solid lines, to its sealing position, illustrated in dash lines.

Figure 5A:
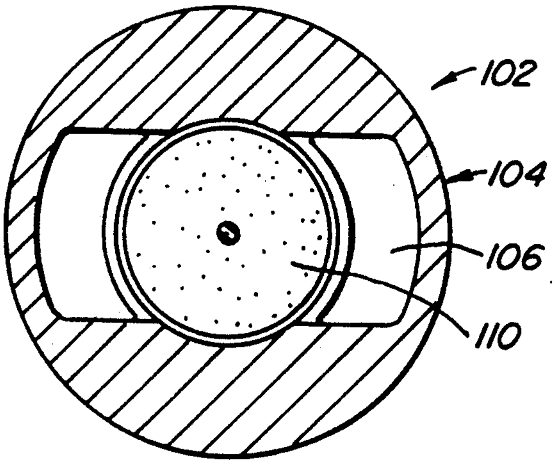
FIG. 5A is a cross-sectional view taken along line 5A—5A of FIG. 5.
Figure 5:
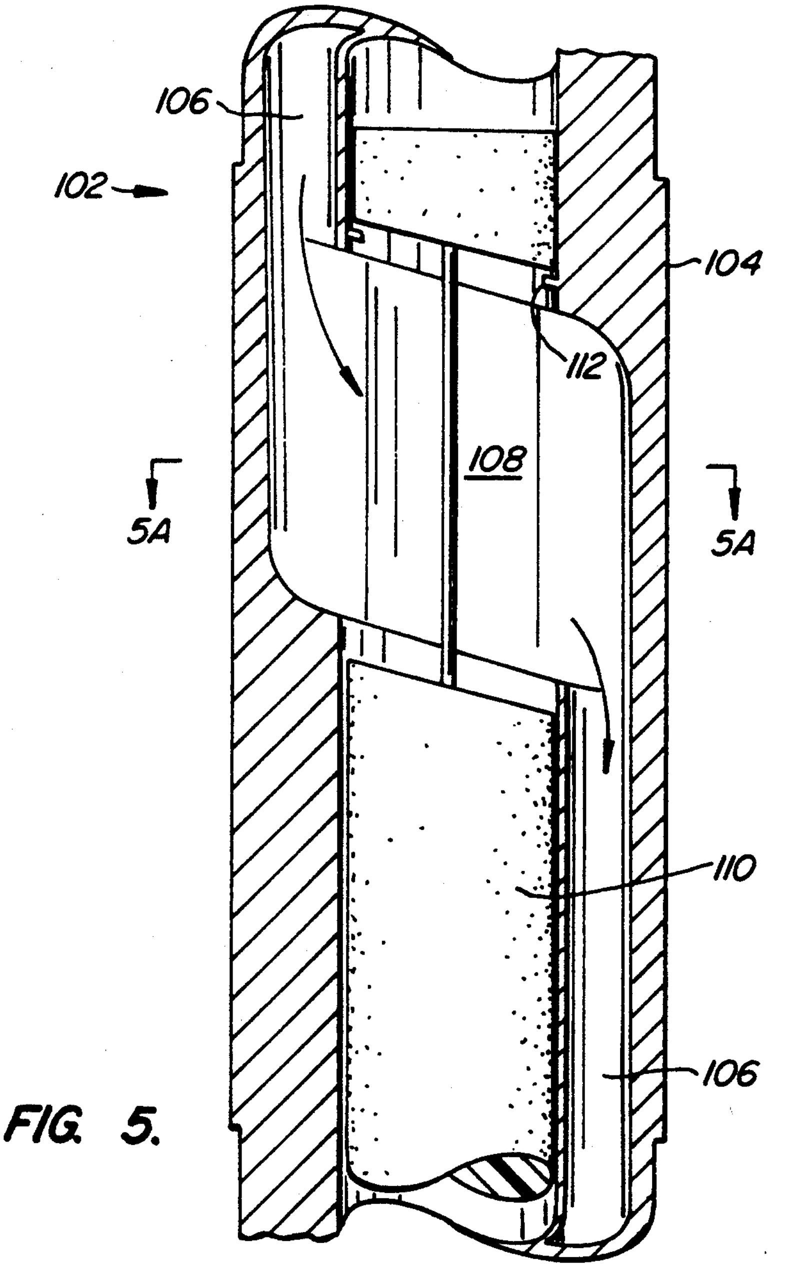
FIG. 5 is a simplified side view of an alternative embodiment of the drop tube assembly of FIG. 4.

FIG. 5 illustrates an alternative embodiment of drop tube assembly 72 shown in FIG. 4. Drop tube assembly 102 includes a drop tube 104 having an interior 106 with a segment 108 which is sealable by a cylindrical floating valve element 110. Floating valve element 110 is somewhat similar to tubular float 90 in that when the liquid level within the tank rises to the level of floating valve element 110, the floating valve element begins to float, thus restricting flow through segment 108. When element 110 seats against a stop 112, segment 108 becomes substantially sealed and thus substantially stops liquid flow through interior 106.

Other modifications and variations can be made to the disclosed embodiments without departing from the subject of the invention as defined in the following claims.

What is claimed is:

1. A drop tube assembly for use with a tank while filling the tank from a liquid source, the assembly comprising:

a hollow drop tube having an interior, an exterior, an upper end couplable to the liquid source and a lower end;

a barrier sealing the interior of the drop tube at a barrier position along the drop tube;

an outlet port formed through the drop tube above the barrier and through which liquid from the liquid source can flow from the interior of the tube and into the tank;

the drop tube having a tapered part positioned below the outlet port, the tapered part being tapered inwardly toward the lower end;

a restrictor sleeve slidably mounted to the exterior of the drop tube, the restrictor sleeve having an inner surface tapered inwardly toward the lower end; and float means for moving the restrictor sleeve between a first position, at which the outlet port is at least substantially unobstructed by the restrictor sleeve, and a second position, at which the outlet port is at least substantially obstructed by the restrictor sleeve so that liquid flow through the outlet port and into the tank is at least substantially stopped, when the level of the liquid in the tank reaches a predetermined level, wherein the tapered part of the drop tube and the inner surface of the restrictor sleeve are sized so that there is a variable diametral clearance between at least a portion of the opposed inwardly tapered surfaces, irregardless of the position of the restrictor sleeve so as to aid free movement of the restrictor sleeve between the first and second positions.

2. The assembly of claim 1 wherein the drop tube, except for the tapered part, has a constant cross-sectional shape.

3. The assembly of claim 1 wherein the drop tube includes an upper, smaller-diameter portion and a lower, larger-diameter portion.

4. The assembly of claim 1 wherein the barrier position is at the lower end of the drop tube.

5. The assembly of claim 1 wherein the outlet port includes a plurality of openings formed through the drop tube.

6. The assembly of claim 1 further comprising means for limiting upward movement of the sleeve past the second position.

7. The assembly of claim 1 wherein said diametral clearance is at least about 0.002 inch (0.05 mm).

8. The assembly of claim 1 wherein the float means includes a tubular buoyant float sized to fit loosely around the drop tube toward the upper end.

9. The assembly of claim 8 wherein the float means includes connecting rods connecting the float to the restrictor sleeve.

10. A drop tube assembly used to fill tanks from a delivery device connected to a source of liquid, the assembly comprising:

a hollow drop tube having a length, a hollow interior, an exterior, an upper end, a lower end, a tapered part positioned below the outlet port, the tapered part being tapered inwardly toward the lower end, the drop tube being securable within the tank;

the upper end including a fitting adapted for connection to the delivery device;

a barrier sealing off the interior of the drop tube at a position along the length of the drop tube;

an outlet port positioned above the barrier and fluidly coupling the hollow interior and the exterior;

a restrictor sleeve having an inner surface inwardly tapered toward the lower end and slidably mounted to the drop tube, the restrictor sleeve slidably movable between a first position, at which the outlet port is unobstructed by the restrictor sleeve, and a second position, at which the restrictor sleeve at least substantially obstructs the outlet port; and float means, coupled to the restrictor sleeve, for slidably moving the restrictor sleeve on the drop tube between the first and second positions according to the amount of liquid in the tank, whereby when the restrictor sleeve moves to the second position, liquid movement into the tank is at least substantially stopped by the restrictor sleeve to prevent overfilling the tank, wherein the tapered part of the drop tube and the inner surface of the restrictor sleeve are sized so that there is a variable diametral clearance between at least a portion of the opposed inwardly tapered surfaces, irregardless of the position of the restrictor sleeve so as to aid free movement of the restrictor sleeve between the first and second positions.

11. The assembly of claim 10 wherein the fitting is a twist-lock fitting.

12. A method for assembling a drop tube assembly comprising the following steps:

selecting a hollow drop tube having an interior, an exterior, an upper end couplable to the liquid source and a lower end;

sealing the interior of the drop tube at a barrier position along the drop tube;

providing an outlet port through the drop tube above the barrier and through which liquid from the liquid source can flow from the interior of the tube and into the tank;

mounting a restrictor sleeve to the exterior of the drop tube;

coupling the restrictor sleeve to a float means for moving the restrictor sleeve between a first position, at which the outlet port is at least substantially unobstructed by the restrictor sleeve, and a second position, at which the outlet port is at least substantially but not completely obstructed by the restrictor sleeve so that liquid flow into the tank is at least substantially stopped, when the level of the liquid in the tank reaches a predetermined level, and providing a variable clearance between the restrictor sleeve and the drop tube adjacent the outlet port as said restrictor sleeve moves between said first and said second positions, wherein the not completely obstructed outlet port permits liquid in the drop tube to seep into the tank through said variable clearance so that liquid in the tube and liquid in the tank achieve hydraulic equilibrium.

13. The method of claim 12 wherein the mounting step includes the step of selecting a generally cylindrical restrictor sleeve.

14. The method of claim 13 wherein the coupling step is carried out with the restrictor sleeve located beneath the outlet port when at the first position.

* * * * *